Figure 1:
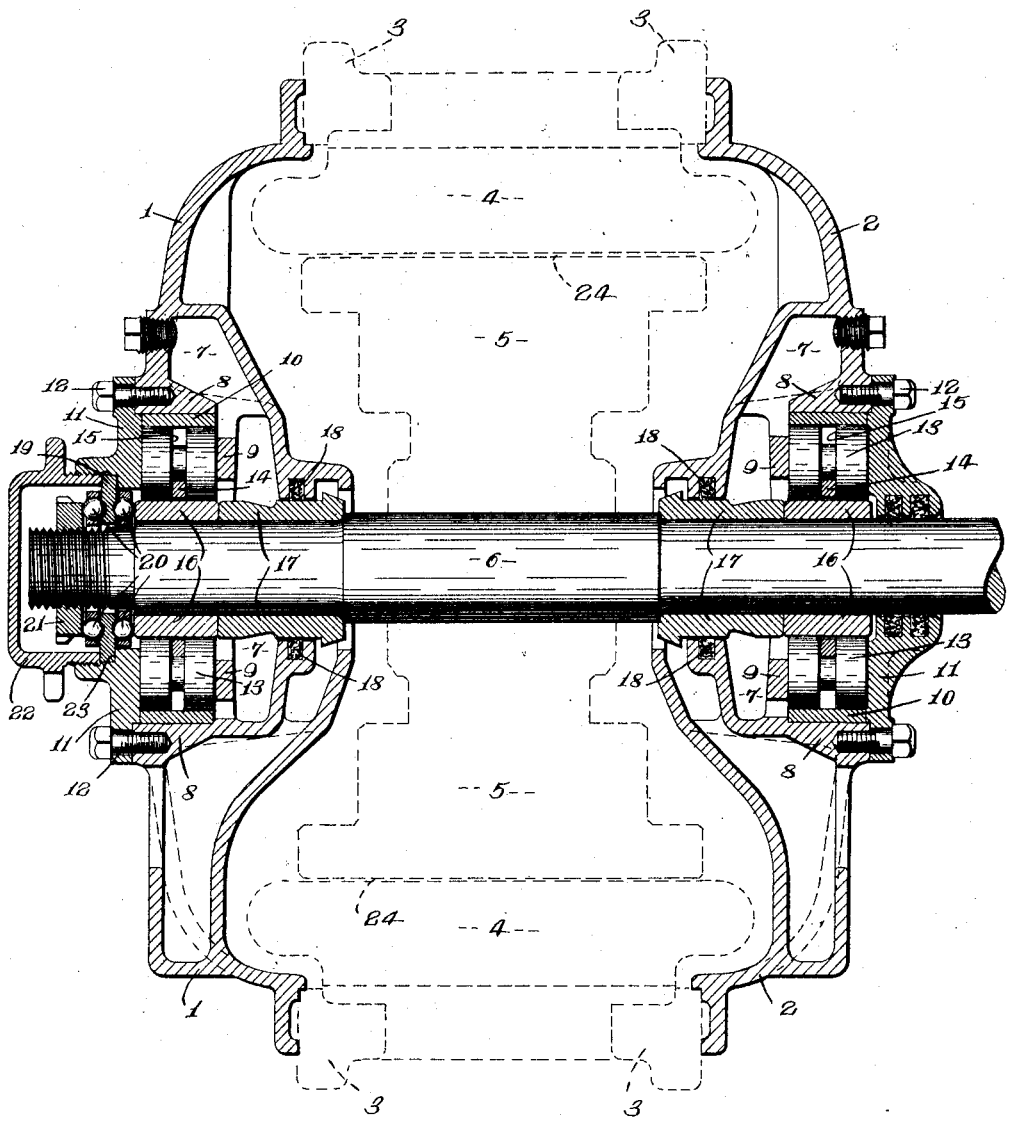

J. N. VANDEGRIFT.
ANTIFRICTION BEARING STRUCTURE FOR ELECTRIC MOTORS.
APPLICATION FILED SEPT. 22, 1911.

1,186,712.

Patented June 13, 1916.
2 SHEETS—SHEET 1.

WITNESSES:

INVENTOR
James N. Vandegrift
BY
Parsons
ATTORNEYS

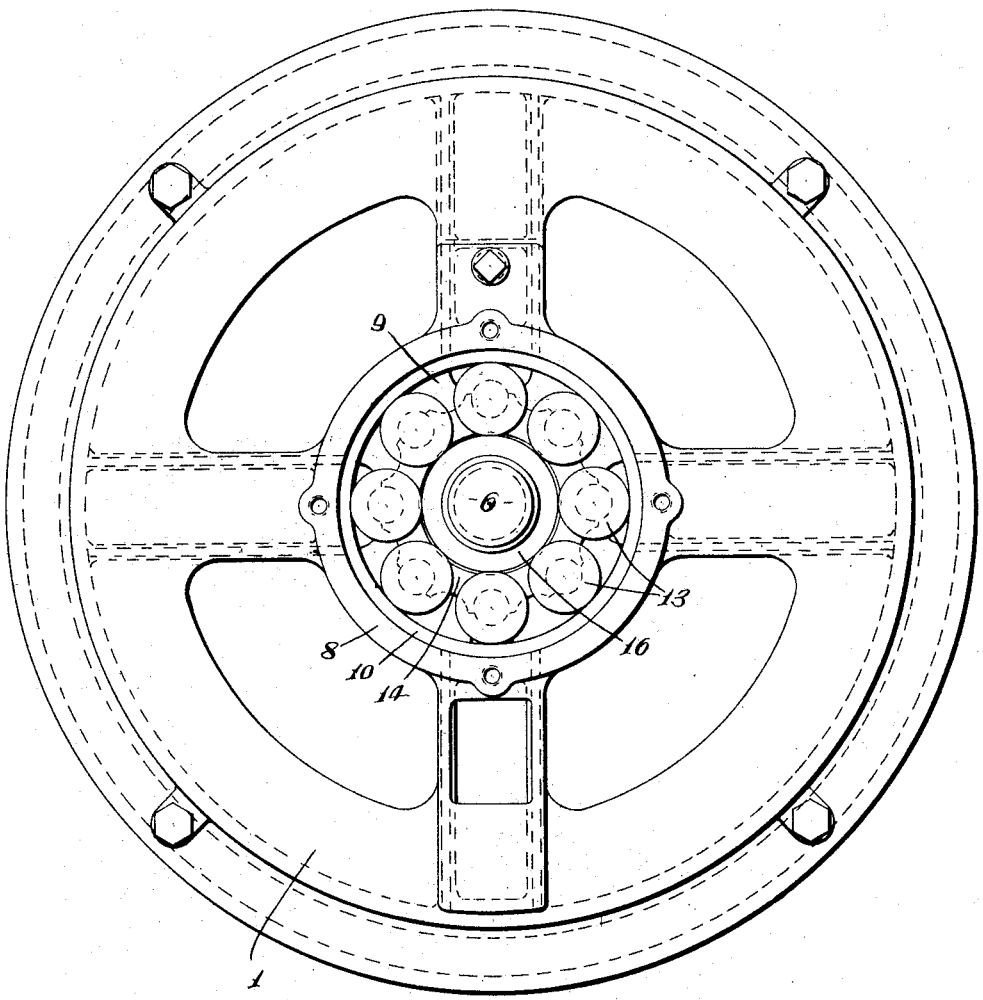

UNITED STATES PATENT OFFICE.

JAMES N. VANDEGRIFT, OF SYRACUSE, NEW YORK, ASSIGNOR TO RAILWAY ROLLER BEARING COMPANY, OF SYRACUSE, NEW YORK, A CORPORATION OF NEW YORK.

ANTIFRICTION-BEARING STRUCTURE FOR ELECTRIC MOTORS.

1,186,712.  Specification of Letters Patent.  Patented June 13, 1916.

Application filed September 22, 1911. Serial No. 650,749.

*To all whom it may concern:*

Be it known that I, JAMES N. VANDEGRIFT, of Syracuse, in the county of Onondaga and State of New York, have invented a certain new and useful Antifriction-Bearing Structure for Electric Motors, of which the following is a specification.

This invention relates to electric motors and particularly to bearings for the rotatable element thereof whereby the efficiency of the motor is increased; and the invention consists in the combinations and constructions hereinafter set forth and claimed.

In describing this invention reference is had to the accompanying drawings in which like characters designate corresponding parts in all the views.

Figure 1 is a sectional view of a motor provided with my invention. Fig. 2 is an end elevation of parts seen in Fig. 1, the closure for the raceway being omitted.

1 and 2 are the heads of the frame of the motor, said frame also including a circumferential wall 3, indicated in dotted lines, which supports the field magnets 4.

5 designates the armature of the motor, and 6 the shaft on which the armature is mounted. The field magnets 4 and armature 5 are also indicated in dotted lines. In this embodiment of my invention the shaft and armature are rotatable and the field is stationary.

The heads 1, 2 are provided respectively with raceways for antifriction bearings for the armature shaft 6 which extends axially of the raceways.

As here shown the raceways are preferably located in inset oil chambers 7 and the raceways are formed by providing the heads 1, 2 with internal hubs 8 within the chambers 7, the raceways having perforated inner end walls 9 through which the oil from the chambers passes into the raceways. A hardened ring 10 is inserted within each of the hubs 8 and forms the cylindrical wall of the raceway. The outer side walls of the raceways are formed by suitable closures 11 opposed to the inner walls 9 and secured in position in any suitable manner as by cap screws 12.

13 is a series of antifriction members as rollers in each of the raceways, each roller being of short length compared with its diameter and the end faces thereof being engaged with the inner and outer walls 9 and 11 of the raceway. The rollers of each series are held spaced apart by a suitable spacing ring 14 which enters grooves 15 in the rollers. Preferably the rollers run on sleeves 16 mounted on the armature shaft 6 within the raceways.

Additional sleeves 17 are also mounted on the armature shaft, the sleeve 17 extending through the walls of the oil chambers 7 which walls are provided with packing rings 18 coacting with the sleeves 17 for preventing oil from entering within the frame.

The armature shaft 6 is held from endwise movement by a thrust bearing carried at the outer end of such shaft and including a member or annular abutment 19 carried by the closure 11 for the outer raceway, and arranged to receive the thrust in opposite directions from the shaft 6. In addition to the member 19, the thrust bearing comprises two annular series of antifriction members as balls 20 arranged on opposite sides of the abutment 19 and coacting with opposite faces thereof and also with annular bearing faces facing opposite sides of the abutment 19 and associated with the shaft 6. The last-mentioned bearing faces are provided respectively on the end face of one of the sleeves 16 and on a nut 21 threading on the end of the shaft 6.

The abutment 19 is clamped between the edge of a cap 22 threading into the outer closure 11, and an annular shoulder 23 provided on said closure.

Owing to the antifriction bearings arranged as described, the motor can be built so that a minimum air space 24 is present between the field magnets 4 and the armature 5 thus increasing the efficiency of the motor, and owing to the thrust bearing the armature is held from any unnecessary movement relatively to the field magnets 4.

What I claim is:

The combination of a machine frame having heads at opposite ends thereof formed with hubs having journal bearings, a rotating shaft extending axially through the frame and the journal bearings, closures for the outer sides of the hubs and a thrust bearing carried by one of the closures and constructed to take the thrust of the shaft in opposite directions.

In testimony whereof, I have hereunto signed my name in the presence of two attesting witnesses, at Syracuse, in the county of Onondaga, in the State of New York, this 30th day of Aug., 1911.

JAMES N. VANDEGRIFT.

Witnesses:
S. DAVIS,
L. M. DAVIS.